US010808168B2

(12) United States Patent
Montenegro Galindo et al.

(10) Patent No.: US 10,808,168 B2
(45) Date of Patent: Oct. 20, 2020

(54) METHODS FOR CONTROLLING CONDUCTIVE AGGREGATES

(71) Applicant: Halliburton Energy Services, Inc., Houston, TX (US)

(72) Inventors: Gladys Montenegro Galindo, Kingwood, TX (US); Dipti Singh, Kingwood, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/342,919

(22) PCT Filed: Jan. 19, 2017

(86) PCT No.: PCT/US2017/014096
§ 371 (c)(1),
(2) Date: Apr. 17, 2019

(87) PCT Pub. No.: WO2018/136064
PCT Pub. Date: Jul. 26, 2018

(65) Prior Publication Data
US 2020/0048541 A1 Feb. 13, 2020

(51) Int. Cl.
*E21B 43/267* (2006.01)
*C09K 8/80* (2006.01)
(Continued)

(52) U.S. Cl.
CPC .............. *C09K 8/805* (2013.01); *C09K 8/845* (2013.01); *C09K 8/882* (2013.01); *C09K 8/885* (2013.01); *E21B 43/267* (2013.01)

(58) Field of Classification Search
CPC ......... E21B 43/267; C09K 8/805; C09K 8/80; C09K 8/845; C09K 8/882; C09K 8/885; C09K 8/88
(Continued)

(56) References Cited

U.S. PATENT DOCUMENTS 4,051,603 A    10/1977 Kern, Jr.
4,440,866 A *   4/1984 Lunghofer ................ B01J 2/16
                                                        264/117
(Continued)

FOREIGN PATENT DOCUMENTS

CN    103288425 A    9/2013
EP      0934110 A1   8/1999
(Continued)

OTHER PUBLICATIONS

Naima Bestaoui-Spurr, SPE 168158, Materials Science Improves Silica Sand Strength, SPE International, SPE, Baker Hughes Inc., Copyright 2014, Society of Petroleum Engineers, pp. 1-11.
(Continued)

*Primary Examiner* — Angela M DiTrani Leff
(74) *Attorney, Agent, or Firm* — McGuireWoods LLP

(57) ABSTRACT

Methods and systems for treating a subterranean formation. The method comprises adding proppant particulates to a fluidized bed granulator; spraying a binding agent on the proppant particulates to at least partially coat the proppant particulates with the binding agent, wherein the coated proppant particulates form proto-aggregates; adding the proto-aggregates to a treatment fluid; and introducing the treatment fluid into a fracture within the subterranean formation.

13 Claims, 5 Drawing Sheets

(51) Int. Cl.
*C09K 8/84* (2006.01)
*C09K 8/88* (2006.01)

(58) Field of Classification Search
USPC ..................................................... 160/280.2
See application file for complete search history.

(56) References Cited

U.S. PATENT DOCUMENTS

| | | | |
|---|---|---|---|
| 4,660,642 A | 4/1987 | Young | |
| 4,895,733 A | 1/1990 | Imanidis et al. | |
| 6,209,643 B1* | 4/2001 | Nguyen | C09K 8/5086 166/276 |
| 7,153,575 B2 | 12/2006 | Anderson et al. | |
| 7,350,571 B2 | 4/2008 | Nguyen et al. | |
| 7,384,671 B2* | 6/2008 | Kittle | B05C 19/025 427/459 |
| 2003/0188872 A1 | 10/2003 | Nguyen et al. | |
| 2006/0100342 A1 | 5/2006 | Jensen | |
| 2007/0054054 A1* | 3/2007 | Svoboda | C09K 8/805 427/372.2 |
| 2010/0330380 A1 | 12/2010 | Colreavy et al. | |
| 2011/0024129 A1* | 2/2011 | Turakhia | C09K 8/805 166/369 |
| 2014/0110111 A1* | 4/2014 | Tanguay | C02F 1/001 166/280.2 |
| 2014/0124200 A1 | 5/2014 | Fournier | |
| 2014/0144631 A1 | 5/2014 | Weaver et al. | |
| 2014/0338906 A1 | 11/2014 | Monastiriotis et al. | |
| 2015/0275072 A1 | 10/2015 | Rediger | |
| 2016/0122630 A1* | 5/2016 | Wehunt | C09K 8/80 507/203 |

FOREIGN PATENT DOCUMENTS

| | | |
|---|---|---|
| WO | 1992011327 A1 | 7/1992 |
| WO | 9824542 A1 | 11/1998 |

OTHER PUBLICATIONS

International Search Report and Written Opinion dated Oct. 19, 2017, International PCT Application No. PCT/US2017/014096.

* cited by examiner

MULTIPLE CONTACT POINTS

METHODS FOR CONTROLLING CONDUCTIVE AGGREGATES

TECHNICAL FIELD

The present disclosure relates to methods of controlling conductive aggregates, and more particularly, to methods of controlling the size of conductive aggregates downhole, methods of reducing proppant/aggregate settling, and methods of increasing the probability of conductive aggregate formation downhole.

BACKGROUND

Stimulation techniques may be used to increase the amount of hydrocarbons obtained from a subterranean formation. For example, some subterranean formations may be fractured to improve well productivity by placing or enhancing fractures running from a wellbore into a surrounding subterranean formation.

Once a fracture has been formed, proppant may be used to prop the fracture and prevent the formation pressure from closing the created or enhanced fracture. One technique for propping a fracture is to pump a proppant-laden fluid or slurry with a fracturing fluid to create or enhance a fracture and form a proppant pack therein. The proppant pack props the fracture as the formation pressure closes the fracture. The proppant pack is permeable, and hydrocarbons may flow through the interstitial spaces between the proppant particulates and into the wellbore where they may be produced. Another technique for propping a fracture is to pump sequenced stages of treatment fluids into the fracture by pulsing the treatment fluids at short intervals and high pressures. Generally, the treatment fluid stages comprise pumping a proppant-laden fluid and a spacer fluid that may separate the proppant particulates within the proppant-laden fluid. The proppant particulates may then aggregate to form pillar-like aggregates that prop the fracture and resist the closure pressure of the subterranean formation. The spacer fluid and fluid component of the proppant-laden fluid may be used to fill the voids between the proppant pillars. These fluids may then be removed and flowed out of the fracture, leaving channels between and around the proppant pillar-like aggregates through which hydrocarbons may flow into the wellbore and be produced. These channels may have infinite permeability. The proppant pillars may stabilize the fracture in a similar manner as a proppant pack.

There are several issues that may occur when propping a fracture. For example, the proppant may settle and fall out of the spacer fluid or fracturing fluid. If the proppant settles to the bottom of the fracture, the proppant may not aggregate in a way to sufficiently prop the fracture and the fracture may have a poor vertical distribution of propping aggregates. Another issue is that the proppant may not aggregate at all or may form aggregates of insufficient size and strength. If aggregates of insufficient size or strength are formed, the fracture may not be propped effectively and may close or have reduced production. Some of these issues may be addressed through the use of larger-sized proppant. However, larger-sized proppant is typically more expensive than the smaller-sized proppant and may not be as readily available as the traditional smaller-sized proppant such as sand.

BRIEF DESCRIPTION OF THE DRAWINGS

Illustrative examples of the present disclosure are described in detail below with reference to the attached drawing figures, which are incorporated by reference herein, and wherein.

Figure 1:
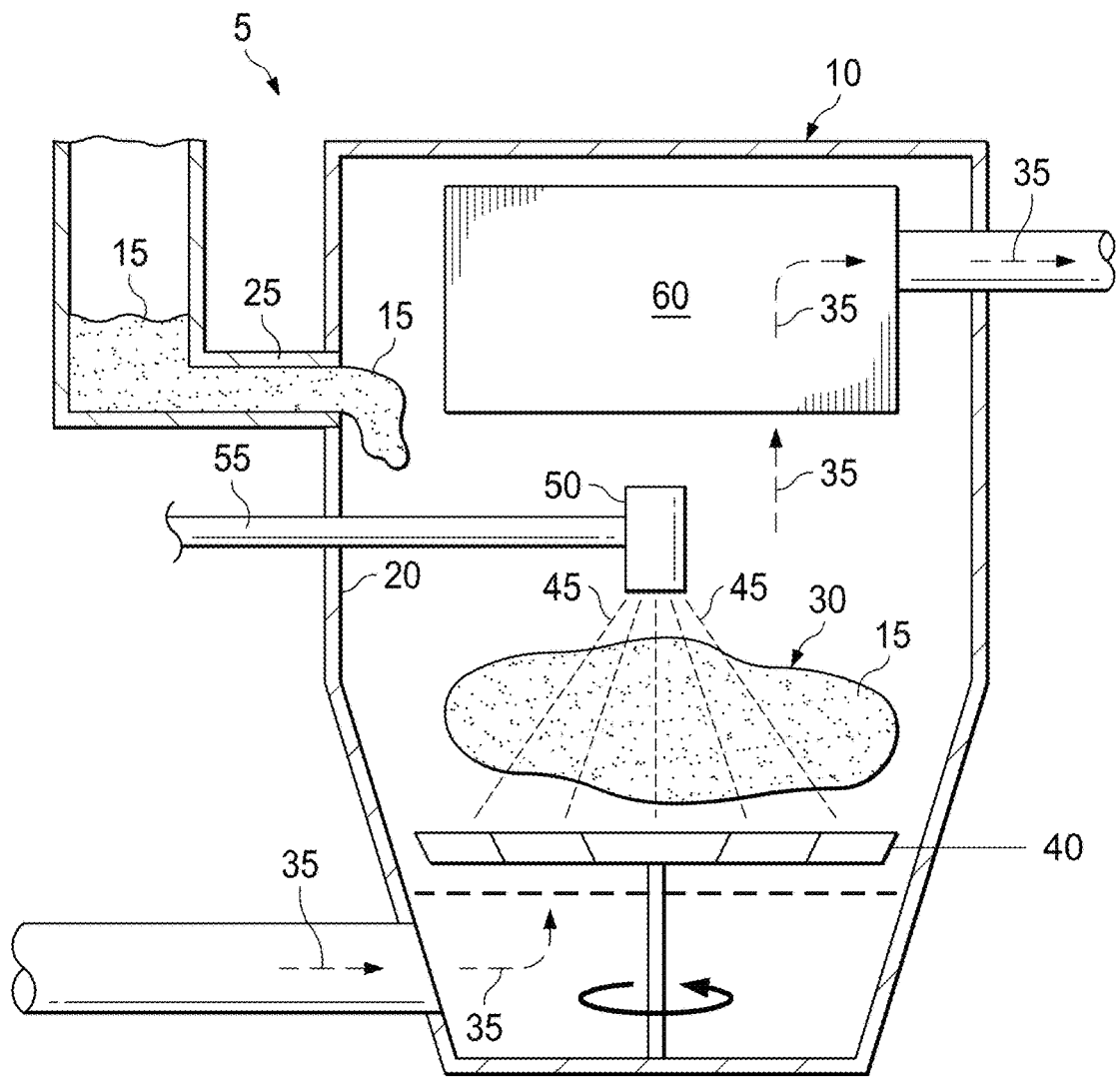
FIG. 1 illustrates a cross-section of a system for a method of mechanical granulation of proppant particulates into proto-aggregates in accordance with certain examples of the present disclosure.

The illustrated figures are exemplary only and are not intended to assert or imply any limitation with regard to the environment, architecture, design, or process in which different examples may be implemented.

DETAILED DESCRIPTION

The present disclosure relates to methods of controlling conductive aggregates, and more particularly, to methods of controlling the size of conductive aggregates downhole, methods of reducing proppant/aggregate settling, and methods of increasing the probability of conductive aggregate formation downhole.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Examples of the methods described herein comprise the production of proto-aggregates and the introduction of the proto-aggregates into a wellbore penetrating a subterranean formation. The proto-aggregates comprise proppant particulates and may be produced by a mechanical granulation method and then added to a treatment fluid when desired, or the proto-aggregates may be produced using an on-the-fly chemical coating method and then added to a treatment fluid as the treatment fluid is introduced into the wellbore. The proto-aggregates may be used to improve the permeability and quality of traditional proppant packs or to form pillar-like aggregates in a fracture. The proto-aggregates may increase the probability of forming these larger propping aggregates necessary to prop a fracture. The size of the proto-aggregates may be controlled so that the proto-aggregates are not large enough to be screened out or settle to the bottom of the fracture. Some larger-sized proto-aggregates may be too large to enter the fracture. Additionally, some larger-sized proto-aggregates may settle to the bottom of the fracture, and if these proto-aggregates settle to accumulate at the bottom of the fracture, an expansive vertical distribution of propping aggregates may not be present in the fracture. This may result in a fracture that is not propped effectively. Therefore, actively controlling the size of the proto-aggregates as they are produced may assist in efficient propping aggregate formation in the fracture and may aid in maintaining sufficient vertical distribution of the propping aggregates in the fracture. The proppant pack or pillar-like aggregates may be used to prop the fracture such that the formation pressure does not close the fracture. Hydrocarbons may flow from the subterranean formation into the propped fracture. Hydrocarbons may then flow from the propped fracture into the wellbore where they may be pumped to the surface.

All examples described herein comprise proppant particulates. The proppant particulates may be used in a treatment fluid comprising proppant particulates and an aqueous carrier fluid. In some examples, the treatment fluid may be a proppant-laden treatment fluid (i.e., a proppant slurry) introduced to the wellbore without mixture with additional treatment fluids. In some examples, the proppant-laden fluid may be added at the surface to and/or mixed downhole with other treatment fluids, for example, fracturing fluids used to fracture or enhance a fracture in a subterranean formation, or spacer fluids that may be used to provide space between and to separate the proto-aggregates within a proppant-laden fluid. In other examples, the proppant particulates may be added to or used to prepare treatment fluids such as fracturing fluids or spacer fluids directly, without first preparing a proppant-laden fluid. The proppant particulates may include naturally-occurring particles such as sand grains or man-made particles such as ceramics. Suitable proppant particulates include, but are not limited to, sand, natural sand, quartz sand, bauxite and other ore, ceramic materials, glass materials, particulate garnet, metal particulates, nylon pellets, polymer materials, polytetrafluoroethylene materials, or combinations thereof. Suitable proppant particulates may also include composite particulates comprising a binder and a filler material wherein suitable filler materials include silica, alumina, fumed carbon, carbon black, graphite, mica, titanium dioxide, meta-silicate, calcium silicate, talc, zirconia, boron, slag, fly ash, hollow glass microspheres, solid glass, or combinations thereof. The proppant particulates may be selected to have one or more properties such as a specific average particle size distribution, sphericity, density, specific gravity, shape, or another property. The concentration of the proppant in the proppant-laden fluid may range from about 0.1% (w/v) of the proppant-laden fluid to about 20% (w/v) of the proppant-laden fluid. The concentration of the proppant in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the proppant in the treatment fluid may be about 0.1% (w/v) of the treatment fluid, about 0.2% (w/v) of the treatment fluid, about 0.5% (w/v) of the treatment fluid, about 1% (w/v) of treatment fluid, about 2% (w/v) of the treatment fluid, about 3% (w/v) of the treatment fluid, about 4% (w/v) of the treatment fluid, about 5% (w/v) of the treatment fluid, about 10% (w/v) of the treatment fluid, about 15% (w/v) of the treatment fluid, or about 20% (w/v) of the treatment fluid. With the benefit of this disclosure, one of ordinary skill in the art will be able to obtain and prepare a treatment fluid comprising proppant particulates for a given application.

The proppant particulates may be variously sized and may comprise micro proppant particulates (for example, those proppant particulates smaller than 100 mesh (i.e., about 150 µm)) used alone or in combination with proppant particulates having an average particle size distribution greater than or equal to 100 mesh. Generally, the proppant particulates have an average particle size distribution in the range of about 500 mesh to 12 mesh, U.S. Sieve Series or about 5 to about 1700 µm. For example, the proppant particulates may have an average particle size distribution in the range of from about 5 µm to about 1700 µm, encompassing any value and subset therebetween, such as about 5 µm to about 20 µm, about 20 µm to about 40 µm, about 40 µm to about 60 µm, about 60 µm to about 80 µm, about 80 µm to about 100 µm, about 100 µm to about 120 µm, about 120 µm to about 140 µm, about 140 µm to about 150 µm, about 150 µm to about 200 µm, about 200 µm to about 400 µm, about 400 µm to about 600 µm, about 600 µm to about 800 µm, about 800 µm to about 1000 µm, about 1000 µm to about 1200 µm, about 1200 µm to about 1400 µm, about 1400 µm to about 1600 µm, or about 1600 µm to about 1700. In some examples, the proppant particulates have an average particle size distribution in the range of from a lower limit of 5 µm, 10 µm, 15 µm, 20 µm, 25 µm, 30 µm, 35 µm, 40 µm, 45 µm, and 50 µm, about 60 µm, about 70 µm, about 80 µm, about 90 µm, about 100 µm, about 110 µm, about 120 µm, about 130 µm, about 140 µm, about 150 µm, 200 µm, 200 µm, 400 µm, 600 µm, 800 µm, 1000 µm, and 1200 µm to an upper limit of about 50 µm, about 60 µm, about 70 µm, about 80 µm, about 90 µm, about 100 µm, about 150 µm, about 200 µm, about 300 µm, about 400 µm, about 500 µm, about 600 µm, about 800 µm, about 1000 µm, about 1200 µm, about 1400 µm, about 1600 µm, and about 1700 µm, encompassing any value and subset therebetween. In some examples, the proppant particulates may comprise a multi-modal particle size distribution; the maxima of any modes may encompass any of the particle size distributions described herein.

In the various examples, the treatment fluids comprise an aqueous carrier fluid used to transport the proppant particulates into the wellbore and fracture. The aqueous carrier fluid may generally be from any source. In various examples, the aqueous carrier fluid may comprise fresh water, salt water, seawater, brine, or an aqueous salt solution. In some embodiments, the aqueous carrier fluid may comprise a monovalent brine or a divalent brine. Suitable monovalent brines include, but are not limited to, sodium chloride brines, sodium bromide brines, potassium chloride brines, potassium bromide brines, and the like. Suitable divalent brines include, but are not limited to, magnesium chloride brines, calcium chloride brines, and the like. An aqueous carrier fluid may be used with any treatment fluid, for example, proppant-laden fluids, spacer fluids, fracturing fluids, or any combination thereof.

In all examples, the proppant particulates are contacted with a binding agent used to assist in the formation of the propping aggregates, for example, a proppant pack or pillar-like aggregate. The binding agent may comprise any of a number of suitable adhesive substances. General examples of binding agents may include resins, geopolymers, and cements. The binding agent may be applied in mechanical granulation examples to form proto-aggregates that may be stored and then used in a treatment fluid as desired. An additional binding agent, which may be different from that used during mechanical granulation, may also be added to the treatment fluid at the field operation to form the propping aggregates downhole. The binding agent may also be applied in on-the-fly chemical coating examples at the well site and may be added to a treatment fluid comprising the proto-aggregates prior to pumping the treatment fluid into the wellbore. The binding agent may be activated by curing (e.g., when using curable resins) or reacting it with an activator (e.g., when using a cement) so as to harden and bond the proppant particulates into proto-aggregates or larger aggregate structures such as proppant packs or pillar-like aggregates.

General examples of binding agents include curable resins. Examples of curable resins may include two-component epoxy-based resins, novolac resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins, polyurethane resins, acrylate resins, derivatives thereof, and mixtures thereof. Some suitable resins, such as epoxy resins, may be cured with an internal catalyst or activator so that when pumped downhole, they may be cured using only time and temperature. Other suitable resins, such as furan resins, generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. Other examples of suitable curable resins include geopolymer resins. Geopolymer resins may be prepared in various ways. For example, a geopolymer resin may be prepared by dissolution of metal oxide precursors via acid-base reactions and subsequent precipitation of phosphates or silico phosphates. In another example, geopolymer resins are prepared by coupled alkali-mediated dissolution and precipitation reactions of silicate or aluminosilicate precursors in an aqueous media. Geopolymer resins including silicoaluminophosphates may be prepared by reacting metakaolin or metakaolinite with phosphoric acid. Still other geopolymer resins may be formed by reacting a clay material with an alkaline or acidic solution. In still further examples, metakaolin and metakaolinite are reacted with an alkaline solution to form the geopolymer resin. Curing the geopolymer resin may yield a geopolymer gel or a geopolymer. The curing process may take place at temperatures including, for example, an ambient temperature (e.g., 15-35° C.) and an elevated temperature (e.g., 40-90° C.). Additional suitable curable resins include UV-curable resins. Curing of the UV-curable resins may include exposing the UV-curable resin to UV light or an electron beam, wherein a photoinitiator may be added if the resin is to be cured with UV light and a photoinitiator may be optionally added to the resin prior to curing if the resin is to be cured with the electron beam. Examples of UV-curable resins include epoxy resin, a urethane acrylate resin, an epoxy methacrylate resin, an epoxy-modified novolac resin, a resole resin, a modified resole resin, a terpolymer of phenol furfuryl alcohol and formaldehyde, a furan resin, a urethane resin, a melamine resin, derivatives thereof, and mixtures thereof. It is within the ability of one skilled in the art, with the benefit of this disclosure, to select a suitable resin for use in embodiments of the present invention and to determine whether a catalyst is required to trigger curing.

General examples of binding agents include cements. Generally, the cement may be any cementitious material that sets and hardens after contacting an activator of that cementitious material. For example, a hydraulic cement sets and hardens through a hydration reaction with water. The term "activator" does not require any particular degree of chemical reaction between the activator and the cementitious material. A variety of cementitious materials are suitable for use, including those comprising calcium, aluminum, silicon, oxygen, sulfur, or a combination of any of these materials. Cementitious materials which may be suitable for use include, but are not limited to, Portland cements, pozzolanic materials (e.g., fly ash, slag, calcined metakaolin, and the like) which set upon the addition of an alkali activator or an acid activator, geopolymer cements (e.g., alkali- or acid-activated alumino silicate cement), phosphate cements (e.g., cements that undergo a phosphate reaction with a metal oxide activator or a pozzolan activator), gypsum cements, aluminous cements, silica cements, alkaline cements, high content alumina cements, magnesium oxide cements, acid resistant silicate cements, oxysalt cementitious systems (e.g., magnesium oxychloride, magnesium oxysulfate, Mg/Al oxysulfate, and the like), silico phosphate cements, glass phosphate cements, and mixtures thereof. After the cementitious material is activated, the cement may be used as a binding agent for use in forming the proto-aggregates or larger aggregates such as proppant packs or pillar-like aggregates.

In the examples of the on-the-fly chemical coating method, the proppant particulates may be contacted with a non-tacky silane coating solution prior to preparation of the treatment fluid and contact with the binding agent. The silane coating solution may comprise a silane and/or a siloxane. Examples of silanes include, but are not limited to, a disilane; a trisilane; a tetrasilane; a pentasilane; a 2-silyl-trisilane; a 2,2-disilytrisilane; a polysilane; a triethoxysilane; a methyldiethoxysilane; an alkoxysilane; a halosilane; an aminosilane; a chlorosilane; a N,O-bis(diethylhydrogensilyl)trifluoroacetamide; a 1,2-bis(dimethylsilyl)benzene; a tert-butyldimethylsilane; a tert-butyldiphenylsilane; a chlorodimethylsilane; a chlorodiisopropylsilane; a dichloromethylsilane; a methyldiphenylsilane; a dichloroethylsilane; a dimethoxy(methyl)silane; a dimethylphenylsilane; a diethoxymethylsilane; a diphenylsilane; a diphenylsilane; a di-tert-butylsilane; a diethylsilane; a phenylsilane; a trichlorosilane; a triphenylsilane; a triethylsilane; a 1,1,3,3-tetramethyldisilazane; a trimethoxysilane; a trihexylsilane; a 1,1,3,3-tetramethyldisiloxane; a triisopropylsilane; a tetrakis(dimethylsilyl)silane; a 1,1,2,2-tetraphenyldisilane; a tribenzylsilane; a tributylsilane; a substituted silane; and any combination thereof. Examples of siloxanes include, but are not limited to, a polydimethylsiloxane; a hexamethylcyclotrisiloxane; a hexamethyldisiloxane; an octamethylcyclotetrasiloxane; an ocatmethyltrisiloxane; a decamethylcyclopentasiloxane; a decamethyltetrasiloxane; a dodecamethylcyclohexasiloxane; an allyltris(trimethylsiloxy)silane; a bis(3-trimethoxysilylpropyl)amine; a 1,3-bis(3-aminopropyl)tetramethyldisiloxane; a 1,3-bis(chloromethyl)tetramethyldisiloxane; a 1,3-bis(4-hydroxybutyl)tetramethyldisiloxane); a 1,3-dichloro-1,1,3,3-tetraisopropyldisiloxane; a 1,3-dichloro-1,1,3,3-tetramethyldisiloxane; a 1,3-dimethoxy-1,1,3,3-tetraphyldisiloxane; a 3-(dimethylsilyoxy)-1,1,5,5-tetramethyl-3-phenyltrisiloxane; a 1,3-divinyltetramethyldisoxane; a 1,1,1,3,5,5,5-heptamethyl-3-(3-glycidyloxypropyl)trisiloxane; a 1,1,1,3,5,5,5-heptamethyltrisiloxane; a tetrakis(dimethylsilyoxy)silane; a 1,1,3,3-tetramethyldisiloxane; a 2,4,6,8-tetramethyl-2,4,6,8-tetravinylcyclotetrasiloxane; a 1,1,3,3,-tetraphenyl-1,3-disiloxanediol; and any combination thereof.

Optionally, gelling agents comprising various species of carbohydrates and their derivatives may be added to any of the treatment fluids. The gelling agents may be used to increase the viscosity of the treatment fluids. Examples of the gelling agents may include, but are not limited to, carboxyethyl cellulose, carboxymethyl cellulose, carboxymethylhydroxyethyl cellulose, hydroxyethyl cellulose, hydroxypropyl cellulose, methylhydroxypropyl cellulose, methyl cellulose, ethyl cellulose, propyl cellulose, ethylcarboxymethyl cellulose, methylethyl cellulose, hydroxypropylmethyl cellulose, guar, guar derivatives, tara gum, fenugreek, xanthan gum, or combinations thereof. In a specific example, the gelling agent is an anionic gelling agent. It is to be understood that the gelling agents are optional and may only be used in some examples. The concentration of the gelling agent in a selected treatment fluid may range from about 0.1% (w/v) to about 3% (w/v) of the treatment fluid. The concentration of the gelling agent in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the gelling agent in the treatment fluid may be about 0.1% (w/v) of the treatment fluid, about 0.5% (w/v) of the treatment fluid, about 1% (w/v) of the treatment fluid, about 2.4% (w/v) of the treatment fluid, or about 3% (w/v) of the treatment fluid. With the benefit of this disclosure, one of ordinary skill in the art will be able to obtain and prepare a treatment fluid comprising a gelling agent for a given application.

Optionally, crosslinking agents may be added to the same treatment fluid comprising the optional gelling agent. The crosslinkers may crosslink the gelling agent. The term "crosslinking agent" is defined herein to include any molecule, atom, or ion that is capable of forming one or more crosslinks between molecules of the gelling agent or between one or more atoms in a single molecule of the gelling agent.

The crosslinking agent may comprise a polymeric crosslinker or metal ion that is capable of crosslinking the gelling agent. Examples of suitable crosslinking agents include, but are not limited to, borate ions and zirconium ions. These ions may be introduced by providing any compound that is capable of producing one or more of these ions. Examples of such compounds include, but are not limited to, boric acid, disodium octaborate tetrahydrate, sodium diborate, pentaborates, ulexite, colemanite, zirconium oxychloride, chelates of zirconium, derivatives thereof, and combinations thereof. Suitable crosslinking agents also include titanium based compounds such as titanium oxychloride or organic titanates, such as titanium chloride and triethyl amine complexes, and aluminium based compounds, such as aluminium acetate, organo aluminium complexes, and the like. It is to be understood that the crosslinking agents are optional and may only be used in some examples. The concentration of the crosslinking agent in the selected treatment fluid may range from about 0.001% (w/v) of the treatment fluid to about 1% (w/v) of the treatment fluid. The concentration of the crosslinking agent in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the crosslinking agent in the treatment fluid may be about 0.001% (w/v) of the treatment fluid, about 0.01% (w/v) of the treatment fluid, about 0.1% (w/v) of the treatment fluid, about 0.5% (w/v) of the treatment fluid, or about 1% (w/v) of the treatment fluid. With the benefit of this disclosure, one of ordinary skill in the art will be able to obtain and prepare a treatment fluid comprising a crosslinking agent for a given application.

In some optional examples, the treatment fluids may comprise any number of additional additives. The additional additives may include, but are not limited to, salts, surfactants, acids, fluid loss control additives, a gas, nitrogen, carbon dioxide, surface modifying agents, foamers, corrosion inhibitors, scale inhibitors, catalysts, biocides, friction reducers, antifoam agents, bridging agents, flocculants, $H_2S$ scavengers, $CO_2$ scavengers, $O_2$ scavengers, lubricants, viscosifiers, breakers, weighting agents, relative permeability modifiers, wetting agents, filter cake removal agents, antifreeze agents (e.g., ethylene glycol), and the like. A person skilled in the art, with the benefit of this disclosure, will recognize the types of additives that may be included in the treatment fluids of the present disclosure for a particular application.

FIG. 1 is a cross-section of a system 5 for mechanical granulation of proppant particulates into proto-aggregates. Shown in FIG. 1 is a fluidized bed granulator 10. Proppant particulates 15, represented by the hashed areas, may be fed into the housing 20 of the fluidized bed granulator 10 by a feeder 25 to form a fluidized bed 30 which is maintained in an agitated fluid state by air 35, represented by the associated arrow, which is blown into the housing 20 from the bottom of the fluidized bed granulator 10 to suspend the proppant particulates 15. An agitator 40 of any type, for example, an impeller, may be used to assist in the agitation and suspension of the proppant particulates 15 in order to maintain the fluidized bed 30. A binding agent 45, represented by the associated dashed lines, may be sprayed over the fluidized bed 30 of proppant particulates 15 from a nozzle 50 or other such dispersal tool. The binding agent 45 may be conveyed to nozzle 50 with compressed air via line 55 and may be dissolved in a solvent. The binding agent 45 may contact the proppant particulates 15 within the fluidized bed 30. The binding agent 45 may allow individual proppant particulates 15 to adhere to each other such that proto-aggregates may be formed. The size of the proto-aggregates may be controlled by the residence time within the fluidized bed granulator 10, by the rate of binding agent 45 spray from nozzle 50, by the temperature inside the fluidized bed granulator 10, etc. In preferred examples, the average particle size of the proto-aggregates may be less than one fifth the diameter of the perforation in order to prevent bridging that may lead to premature screen out at the perforation or at the near wellbore region in the fracture. The air 35 may be heated to a desired temperature to aid in evaporation of any solvent and to assist in curing of the binding agent 45. When the solvent has evaporated, porosity within the proto-aggregates may develop as the binding agent 45 cures and provides strength to the proto-aggregates. An air filter 60 may be used to discharge the excess air 35 volume without loss of proppant particulates 15 or any formed proto-aggregates. When proto-aggregates of sufficient size have been formed, the binding agent 45 spraying may be halted, and the temperature of the fluidized bed 30 may be raised to a sufficient temperature (e.g., greater than 200° F. depending upon the binding agent 45 chosen) to obtain rapid curing of the binding agent 45 and to prevent further agglomeration of the proto-aggregates during storage or otherwise before use in a treatment fluid. After the proto-aggregates have formed and the binding agent 45 has cured, the proto-aggregates may be removed from the housing 20 using any sufficient means. It is to be understood that FIG. 1 illustrates a generalized fluidized bed granulator 10, and that many types of fluidized bed granulators may be used to form the proto-aggregates via mechanical granulation, and that the present disclosure does not limit the described methods to any one type of mechanical granulation or fluidized bed granulator.

Various properties of the mechanical granulation process may be controlled so as to provide proto-aggregates of a desired size. For example, the droplet size of the binding agent may be controlled. In an example, the droplet size is between about 5 to about 50 μm. The flow rate of the proppant particulates into the mechanical granulator may be controlled. In an example, the flow rate is about 1,500 to about 3,000 g/min. The spray rate of the binding agent may be controlled. In an example, the spray rate is about 1,500 to about 2,500 g binding agent/min. The inlet air temperature may also be controlled to adjust the curing time of the binding agent. In an example, the inlet air temperature is about 25° C. to 95° C. The residence time of the proppant particulates in the mechanical granulator may be controlled. Longer residence times would provide a larger size proto-aggregate. These parameters may be altered if the operation is to be scaled-up or scaled-down as desired.

The proto-aggregates may be stored until desired for use in a treatment fluid. For example, the proto-aggregates may be stored as a dry solid for a period of time from about 1 day, about 2 days, about 3 days, about 4 days, about 1 week, about 2 weeks, about 3 weeks, about 4 weeks, about 2 months, about 3 months, about 4 months, or longer. When desired for use, a treatment fluid (e.g., a proppant-laden fluid) may be prepared by mixing an aqueous fluid with the proto-aggregates to form a slurry or by adding the proto-aggregates to a treatment fluid either as a dry solid or as the proppant-laden fluid. The proto-aggregates may be added to a treatment fluid before or during introduction of the treatment fluid into a wellbore. During this field application of the proto-aggregates, another binding agent may be added to the treatment fluid to aggregate the proto-aggregates in the fracture to form propping aggregates sufficient to prop the fracture. The binding agent may be the same or a different binding agent used to form the proto-aggregates. As partial aggregation has already occurred from the formation of the proto-aggregates, less binding agent may be used during field application relative to fracturing operations that do not utilize proto-aggregates.

Figure 2:
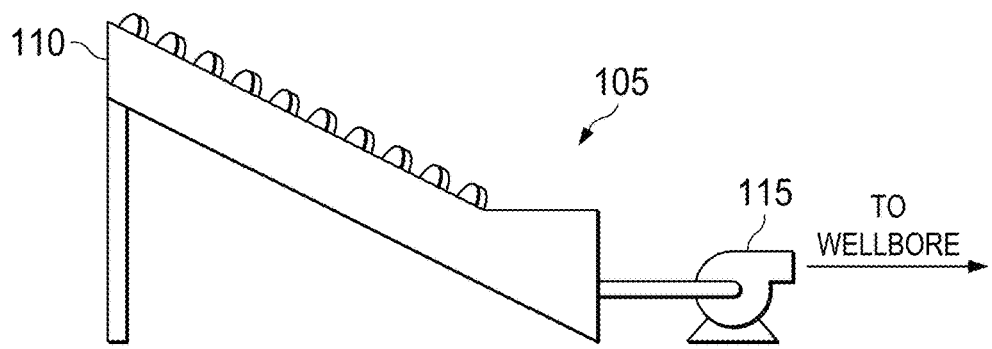
FIG. 2 illustrates a schematic of a system for an on-the-fly chemical coating method of forming proppant particulates into proto-aggregates in accordance with certain examples of the present disclosure.

FIG. 2 is a schematic of a system 105 for an on-the-fly chemical coating method of forming proto-aggregates from proppant particulates. Proppant particulates may be added to an auger device 110 (e.g., a sandscrew). A silane coating solution comprising a silane and/or a siloxane are added to the auger device 110 comprising the proppant particulates. The auger device 110 allows for metering of an amount of proppant particulates and also allows for the proppant particulates to roll and tumble as the pre-coat solution is washed over the proppant particulates. The use of an auger device 110 or auger-like device allows for control of the size of the proto-aggregates formed as the rate of metering of the proppant particulates into the auger device 110 may be controlled as well as the rate at which the auger spins and thus tumbles the proppant particulates through the auger device 110. The auger device 110 should therefore comprise a metering device (e.g., valves or and/or other similar mechanisms) that are capable of controlling whether or not proppant particulates are dispensed (and the amount of proppant particulates dispensed) into the auger device 110. The use of an auger device 110 or auger-like device may also be beneficial in that it allows for coating of the proppant particulates with the silane coating solution and does not require soaking of the proppant particulates in the silane coating solution. The amount of the silane coating solution is added to the auger device 110 may be controlled so as to tailor the size of the proto-aggregates as desired. As the pre-coat solution contacts the proppant particulates, it forms a coating that may adhere proppant particulates together to form proto-aggregates as the proppant particulates roll and tumble through the auger device 110.

With continued reference to FIG. 2, the proto-aggregates may be removed from the auger device 110 and added to a pump and blender system 115. The pump and blender system 115 may comprise a blending tub and/or a pump used to discharge a treatment fluid to a wellbore. In the pump and blending system 115, a treatment fluid comprising the proto-aggregates is prepared. A binding agent used to coat the proto-aggregates for aggregation downhole may be added to the blender tub or to the discharge side of the pump to mix with the proto-aggregates in the treatment fluid as the treatment fluid is pumped downhole. The pump and blender system 115 is not heated, and the binding agent is not cured as it is introduced downhole. The pump and blender system may comprise any pump or blender sufficient for producing the treatment fluid comprising the proto-aggregates. For example, the pump may be a high-pressure pump such as a floating piston pump or a positive displacement pump, or a low-pressure pump such as a centrifugal pump, peristaltic pump, or diaphragm pump. The pump may also be a combination of pumps. Once the treatment fluid has been prepared it may be discharged into the wellbore.

The methods and systems of the present disclosure may be used during or in conjunction with any subterranean fracturing operation. For example, a treatment fluid may be introduced into the formation at or above a pressure sufficient to create or enhance one or more fractures in at least a portion of the subterranean formation. Such fractures may be "enhanced" where a pre-existing fracture (e.g., naturally occurring or otherwise previously formed) is enlarged or lengthened by the fracturing operation.

The treatment fluids used in the methods and systems of the present disclosure may be prepared using any suitable method and/or equipment (e.g., blenders, stirrers, etc.). In some examples, the treatment fluids may be prepared at a well site or at an offsite location. Once prepared, a treatment fluid of the present disclosure may be placed in a tank, bin, or other container for storage and/or transport to the site where it is to be used. In other examples, a treatment fluid may be prepared on-site, for example, using continuous mixing or "on-the-fly" methods, as described below.

In some examples, the treatment fluids may be pumped into the subterranean formation at pressure in stages. For example, a fracturing fluid, a proppant-laden fluid, and/or a spacer fluid may be alternated in a pumping sequence. A pumping sequence of the treatment fluids may be achieved, in some particular examples, through a fluid pumping strategy such as pump cycling. Pump cycling may include any suitable means of accomplishing the introduction of the treatment fluids. In some examples, pump cycling may include alternating the fed treatment fluid into a single pump for pumping a treatment fluid downhole. In some examples, pump cycling may include the use of two or more pumps, with an individual pump responsible for pumping a treatment fluid downhole in succession. For example, where two pumps are used, a first pump fed by a reservoir of a treatment fluid may be cycled on, and then cycled off at substantially the same time that a second pump fed by a reservoir of another treatment fluid is cycled on. Then, the second pump may be cycled off at substantially the same time that the first pump is cycled back on again, and so on, such that the end result is the introduction of alternating treatment fluids into the subterranean formation. Pump cycling may produce a continuous stream of a treatment fluid into a fracture in the subterranean formation. In some examples, an individual pumping cycle may last no longer than 5 minutes. For example, an individual pumping cycle may comprise a time of 5 minutes, 4 minutes, 3, minutes, 2 minutes, 1 minute, 30 seconds, 25 seconds, 20 seconds, 15 seconds, 10 seconds, 5 seconds, or less. As a further example, a pump cycling stage may comprise pumping a treatment fluid for 5 seconds and then immediately pumping another treatment fluid for 5 seconds. This process may be repeated for as many stages as desired.

Figure 3:
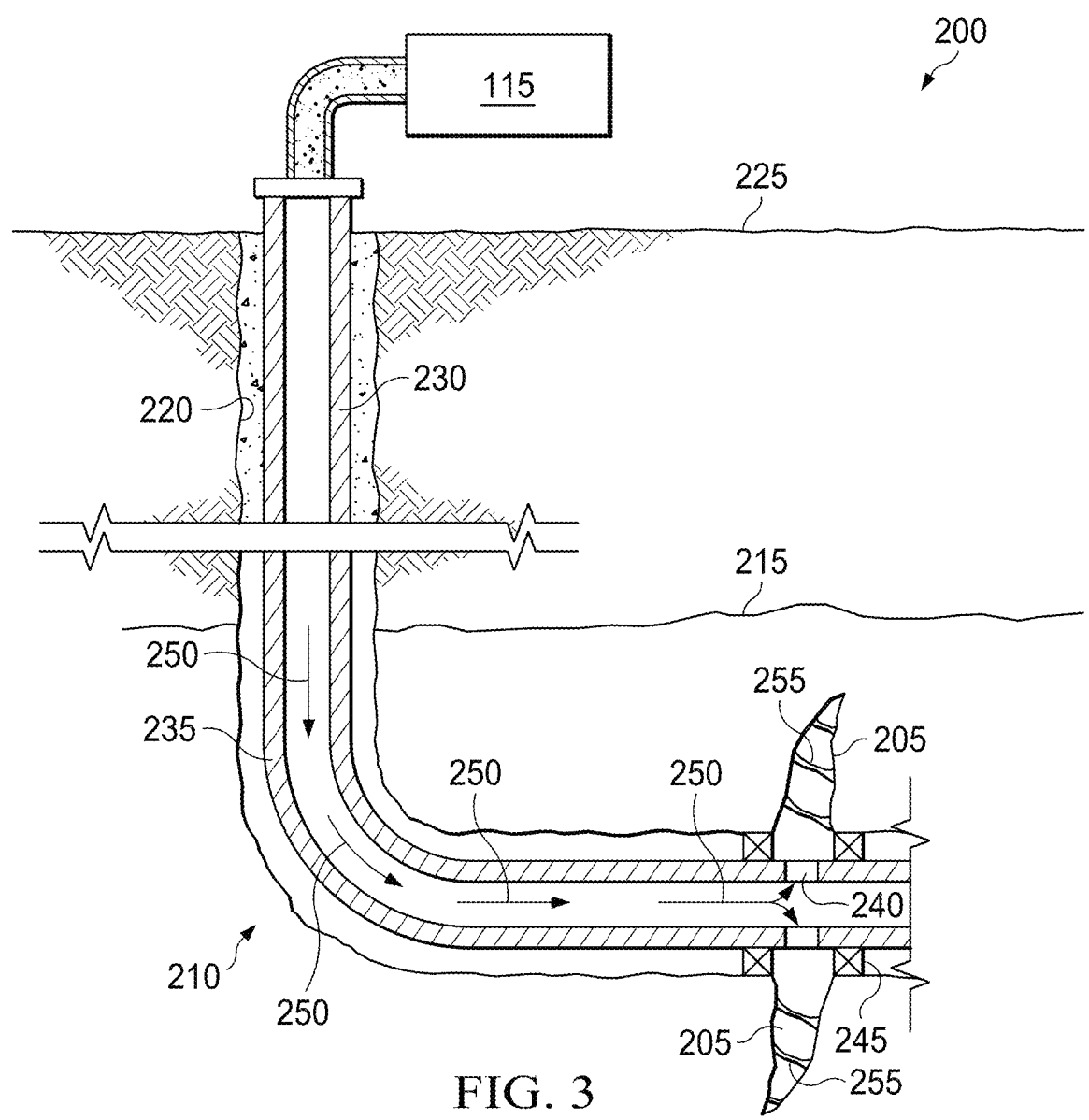
FIG. 3 illustrates a cross-section of a system for propping a fracture in accordance with certain examples of the present disclosure.

FIG. 3 illustrates a cross-section of a system 200 for propping a fracture 205. As illustrated, a well 210 penetrates a portion of a subterranean formation 215 surrounding a wellbore 220. The wellbore 220 extends from the surface 225. Although shown as vertical deviating to horizontal, the wellbore 220 may include horizontal, vertical, slant, curved, and other types of well bore geometries and orientations, and the treatment fluids may be applied to a subterranean zone surrounding any portion of the wellbore 220. The wellbore 220 may include a casing 230 that is cemented, uncemented, or otherwise secured to the wall of the wellbore 220. In some examples, the wellbore 220 may be uncased or include uncased sections. Perforations may be formed in the casing 230 to allow treatment fluids and/or other materials to flow into the subterranean formation 215. In cased wells, perforations may be formed using shape charges, a perforating gun, hydro-jetting, and/or other tools.

The well 210 is shown with a work string 235 descending from the surface 225 into the wellbore 220. The pump and blender system 115 (as described in FIG. 2) is coupled to work string 235 to pump the treatment fluids into the wellbore 220 as is discussed below. The pump and blender system 115 may be used to prepare a treatment fluid using proto-aggregates prepared from either a mechanical granulation method as illustrated in FIG. 1 or an on-the-fly chemical coating method as illustrated in FIG. 2. The work string 235 may include coiled tubing, jointed pipe, and/or other structures that allow fluid to flow into the wellbore 220. The work string 235 may include flow control devices, bypass valves, ports, and/or other tools or well devices capable of controlling the flow of a fluid from the interior of the work string 235 into the subterranean formation 215. For example, the work string 235 may include ports 240 that are spaced apart from the wall of the wellbore 220 to communicate a treatment fluid into an annulus in the wellbore 220 adjacent to a fracture 205 and between the work string 235 and the wall of the wellbore 220. Alternatively, the work string 235 may include ports 240 directly adjacent to a fracture 205 in the wall of the wellbore 220 to communicate a treatment fluid directly into the fracture 205.

With continued reference to FIG. 3, the work string 235 and/or the wellbore 220 may include one or more sets of packers 245 that seal the annulus between the work string 235 and wellbore 220 to define an interval of the wellbore 220 into which a treatment fluid may be pumped. FIG. 3 illustrates two packers 245, one defining an uphole boundary of the interval and one defining the downhole end of the interval.

Treatment fluids 250 may be introduced into wellbore 220 at a sufficient pressure to create, enhance, and/or enter fracture 205. Some of the treatment fluids 250 may comprise proto-aggregates prepared by a mechanical granulation method as illustrated in FIG. 1 or an on-the-fly chemical coating method as illustrated in FIG. 2. In both methods, a binding agent added to the treatment fluid comprising the proto-aggregates before or during introduction into the wellbore 220 may assist in the aggregation of the proto-aggregates into larger propping aggregates within fracture 205. The propping aggregates may be used to prop fracture 205 by forming a proppant pack or pillar-like aggregates within fracture 205 depending upon the propping operation performed. In the illustrated example of FIG. 3, a propping operation has been performed to produce proppant pillar-like aggregates 255 within fracture 205. The proppant pillar-like aggregates 255 comprise the proto-aggregates. The proto-aggregates may be carried into the fracture 205 by any treatment fluid 250 sufficient for suspending and transporting the proto-aggregates, for example, a proppant-laden fluid, spacer fluid, fracturing fluid, etc. In the illustrated example, an alternating sequence of treatment fluids 250, for example, a spacer fluid and a proppant-laden fluid may be introduced into the wellbore 220 to produce the pillar-like aggregates 255. Completion of the fracturing and propping operation may comprise allowing the liquid portion of the treatment fluids 250 to flow out of the fracture 205. The formed pillar-like aggregates 255 may remain in the fracture 205. Hydrocarbons may freely flow out of propped fracture 205 via the channels opened between the pillar-like aggregates 255 when the liquid portions of the treatment fluids 250 are flowed out of the fracture 205.

Figure 4A:
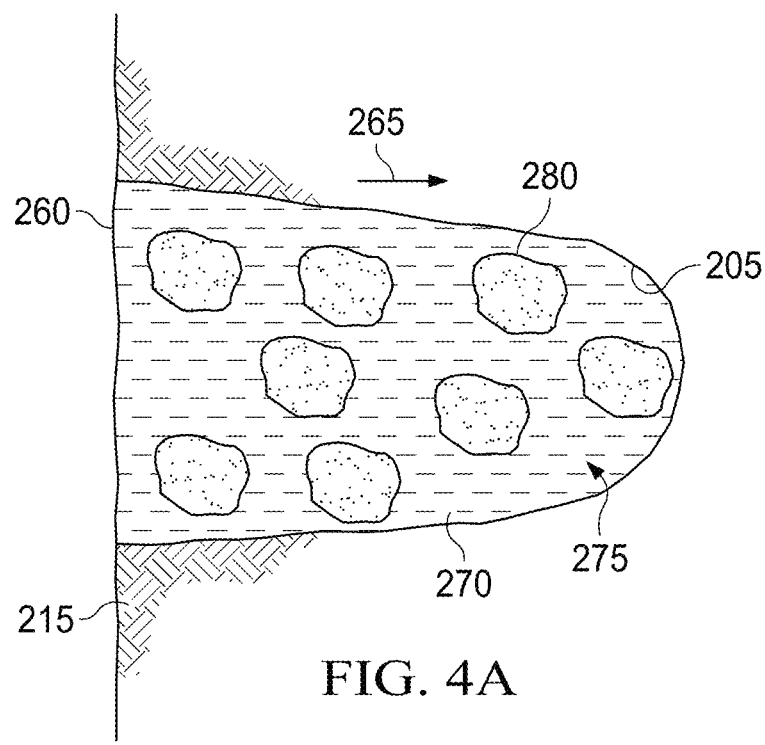
FIG. 4A illustrates an enlarged cross-section of a fracture extending into a subterranean formation with a proppant-laden fluid comprising proto-aggregates dispersed within a spacer fluid in said fracture in accordance with certain examples of the present disclosure.
Figure 4B:
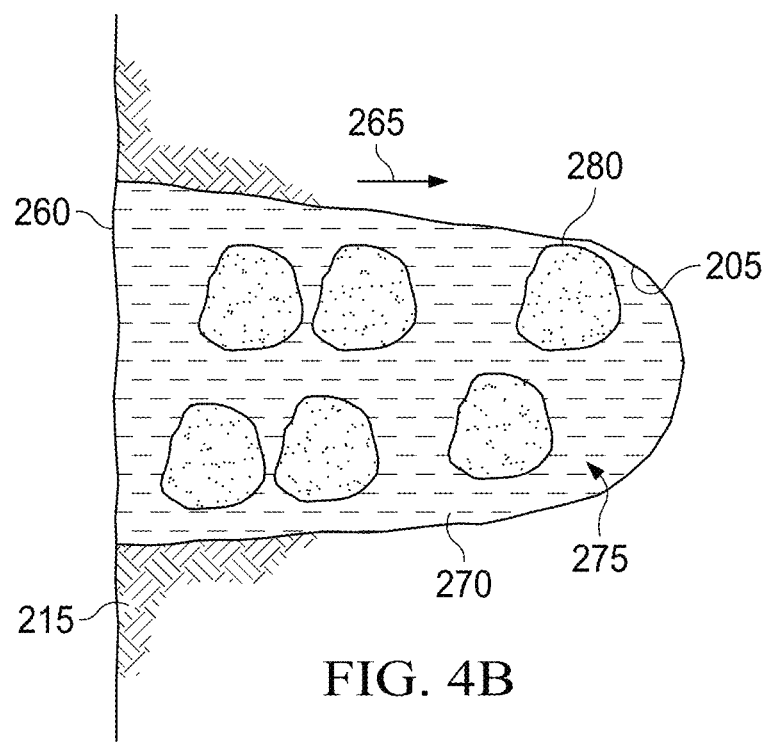
FIG. 4B illustrates the proto-aggregates as presented in FIG. 4A as they begin to agglomerate into various propping aggregates which may prop said fracture in accordance with certain examples of the present disclosure.
Figure 4C:
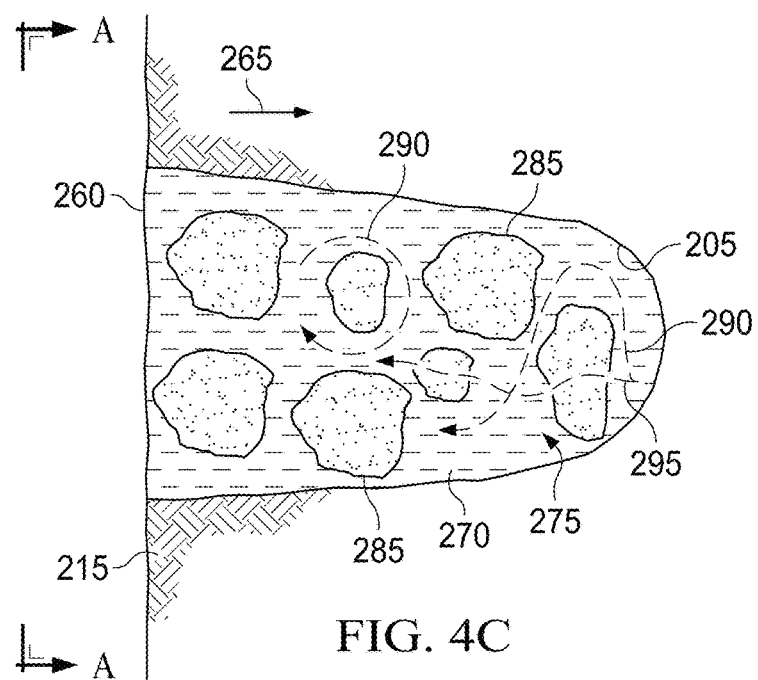
FIG. 4C illustrates the proto-aggregates as presented in FIG. 4B having formed pillar-like aggregates in said fracture in accordance with certain examples of the present disclosure.

FIGS. 4A-4C illustrate an enlarged cross-section of fracture 205 extending into subterranean formation 215. As illustrated, fracture 205 extends from fracture face 260 into subterranean formation 215 in the direction of arrow 265. A proppant-laden fluid 270 (an example of treatment fluid 250 as illustrated in FIG. 3) has been introduced into fracture 205. A spacer fluid 275 (another example of treatment fluid 250 as illustrated in FIG. 3) has also been introduced into fracture 205. Proppant-laden fluid 270 is a slurry comprising proto-aggregates as described above. Spacer fluid 275 is a treatment fluid that fills the void space between clusters of the proto-aggregates (i.e., the continuous phase) so that they do not agglomerate into one large aggregate and instead form several pillar-like aggregates in a vertical distribution within the fracture 205 with sufficient space therebetween (i.e., the discontinuous phase).

Figure 4D:
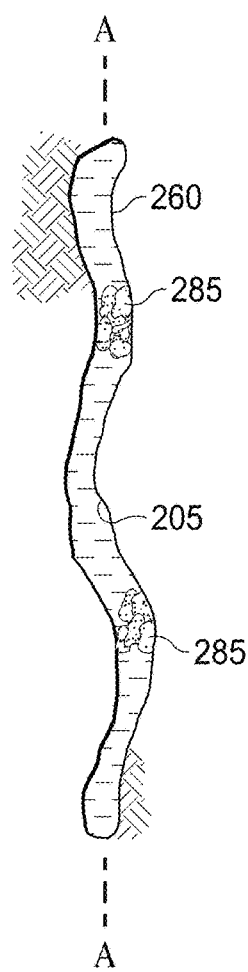
FIG. 4D illustrates an enlarged cross-section of the fracture face presented in FIG. 4C along line A-A in accordance with certain examples of the present disclosure.

FIG. 4A illustrates clusters of the proppant-laden fluid 270 comprising unaggregated proto-aggregates 280 dispersed within the spacer fluid 275. FIG. 4B illustrates the proto-aggregates 280 as they begin to agglomerate into various propping aggregates which may prop fracture 205. The proto-aggregates 280 may adhere to each other upon contact with the use of the binding agent added during preparation of the treatment fluid. Contact may be made as the proto-aggregates 280 begin to settle within the proppant-laden fluid 270 as illustrated. As the proppant particulates within the proto-aggregates were already agglomerated to the degree necessary to form the proto-aggregates 280 while maintaining a size sufficiently small enough to enter fracture 205, the probability of forming a propping aggregate of sufficient size to prop fracture 205 is increased as a portion of the agglomeration necessary to form such a propping aggregate has already been accomplished prior to the proto-aggregates even entering fracture 205. Further, this method may reduce the amount of particle-to-particle contact needed to form the propping aggregates relative to agglomeration using particles that have not been prepared as proto-aggregates 280. This may in turn reduce the amount of proppant particulates that settle out of the proppant-laden fluid 270 and spacer fluid 275 due to the lack of sufficient particle-to-particle contact needed to induce agglomeration and maintain suspension within the fracture 205. FIG. 4C illustrates the proto-aggregates 280 having formed pillar-like aggregates 285. Hydrocarbons, as represented by arrows 290, may flow around the pillar-like aggregates 285 as illustrated. Because the pillar-like aggregates 285 comprise the porous proto-aggregates 285, hydrocarbons may also flow through the pillar-like aggregates 285 as represented by arrows 295. FIG. 4D illustrates a perspective of the fracture face as viewed along line A-A in FIG. 4C. As illustrated, the pillar-like aggregates 285 have formed in fracture 205 and have propped fracture 205 preventing closing of fracture 205. The pillar-like aggregates 285 also function as bridging agents and prevent further settling of proto-aggregates 280 to the bottom of the fracture 205. As such, the vertical distribution of the pillar-like aggregates 285 may be improved relative to pillar-like aggregates 285 formed from proppant particulates that have not been provided as proto-aggregates 280.

It is also to be recognized that the disclosed treatment fluids may directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1-5B.

EXAMPLES

The present disclosure can be better understood by reference to the following examples which are offered by way of illustration. The present disclosure is not limited to the examples given herein.

Example 1

Figure 5A:
FIG. 5A illustrates a scanning electron microscope image of a control sample with no silane solution coating and no corresponding particle-to-particle contact points in accordance with certain examples of the present disclosure.
Figure 5B:
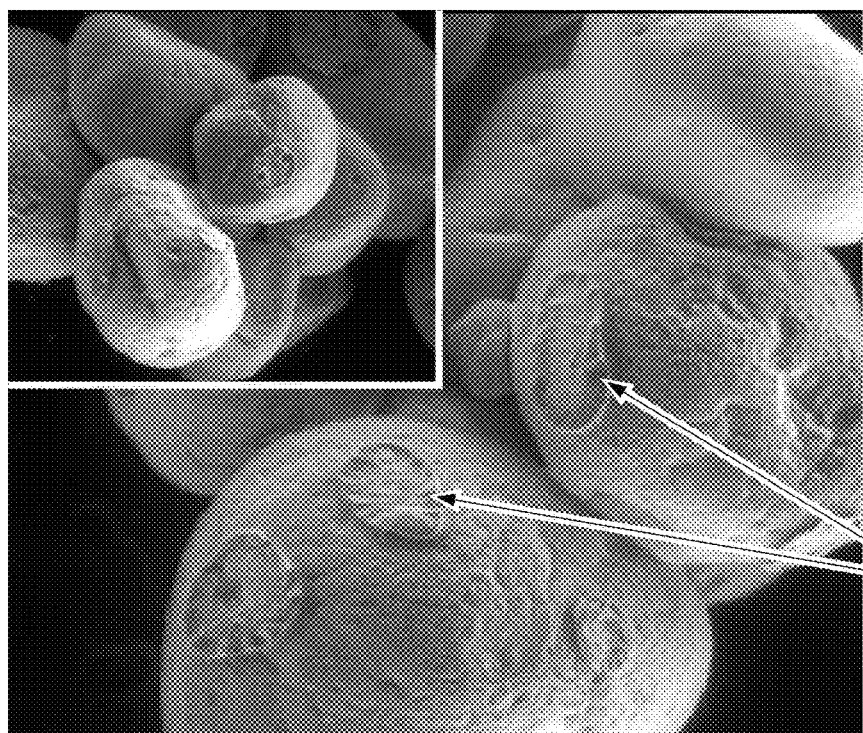
FIG. 5B illustrates a scanning electron microscope image of a silane solution coated experimental sample having formed a proto-aggregate comprising multiple particle-to-particle contact points in accordance with certain examples of the present disclosure.

A comparative example was conducted. A silane coating solution of Bis(3-Trimethoxysilylpropyl)amine silane was used to coat 20/40 sand in accordance with the on-the-fly chemical coating method of forming proto-aggregates as described herein. After coating, the samples were imaged using a scanning electron microscope. FIG. 5A illustrates the control sample with no silane solution coating and no corresponding particle-to-particle contact points. FIG. 5B shows the silane coating solution coated the experimental sample and formed a proto-aggregate as best viewed in the inset, and that the surface of the individual sand particulates comprise multiple contact points 300.

Provided are methods for treating a subterranean formation in accordance with the description provided herein and as illustrated by FIGS. 1-5B. An example method comprises adding proppant particulates to a fluidized bed granulator; spraying a binding agent on the proppant particulates to at least partially coat the proppant particulates with the binding agent, wherein the coated proppant particulates form proto-aggregates; adding the proto-aggregates to a treatment fluid; and introducing the treatment fluid into a fracture within the subterranean formation. The method may further comprise activating the binding agent. The binding agent may be a first binding agent and the method may further comprise adding a second binding agent to the treatment fluid after adding the proto-aggregates to the treatment fluid; wherein the second binding agent may be the same or different from the first binding agent. The residence time of the proppant particulates in the fluidized bed granulator may be controlled such that the average particle size distribution of the proto-aggregates is less than one fifth the diameter of the opening of the fracture. The treatment fluid may be a treatment fluid selected from the group consisting of a fracturing fluid, a spacer fluid, a proppant-laden fluid, and any combination thereof. The proppant particulates may comprise a proppant particulate selected from the group consisting of sand, natural sand, quartz sand, bauxite, ceramic materials, glass materials, particulate garnet, metal particulates, nylon pellets, polymer materials, polytetrafluoroethylene materials, silica, alumina, fumed carbon, carbon black, graphite, mica, titanium dioxide, meta-silicate, calcium silicate, talc, zirconia, boron, slag, fly ash, hollow glass microspheres, solid glass, and any combination thereof. The proppant particulates may have an average particle size distribution in the range of about 5 μm to about 1700 μm. The binding agent may be selected from the group consisting of two-component epoxy based resins, novolac resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins, polyurethane resins, acrylate resins, geopolymer resins, UV-curable resins, epoxy resins, urethane acrylate resins, epoxy methacrylate resins, epoxy-modified novolac resins, resole resins, modified resole resins, a terpolymer of phenol furfuryl alcohol and formaldehyde, melamine resins, Portland cements, pozzolanic cements, geopolymer cements, phosphate cements, gypsum cements, aluminous cements, silica cements, alkaline cements, high-content alumina cements, magnesium oxide cements, acid resistant silicate cements, oxysalt cementitious systems, silico phosphate cements, glass phosphate cements, derivatives thereof, and any combination thereof. The method may further comprise using the treatment fluid comprising the proto-aggregates in a hydraulic fracturing operation.

Provided are methods for treating a subterranean formation in accordance with the description provided herein and as illustrated by FIGS. 1-5B. An example method comprises adding proppant particulates to an auger device; adding a silane coating solution to the auger device to at least partially coat the proppant particulates; wherein the coated proppant particulates form proto-aggregates; adding the proto-aggregates to a treatment fluid; adding a binding agent to the treatment fluid after adding the proto-aggregates to the treatment fluid; and introducing the treatment fluid into a fracture within the subterranean formation. The method may further comprise activating the binding agent. The rate of addition of the proppant particulates to the auger device may be controlled such that the average particle size distribution of the proto-aggregates is less than one fifth the diameter of the opening of the fracture. The treatment fluid may be a treatment fluid selected from the group consisting of a fracturing fluid, a spacer fluid, a proppant-laden fluid, and any combination thereof. The proppant particulates may comprise a proppant particulate selected from the group consisting of sand, natural sand, quartz sand, bauxite, ceramic materials, glass materials, particulate garnet, metal particulates, nylon pellets, polymer materials, polytetrafluoroethylene materials, silica, alumina, fumed carbon, carbon black, graphite, mica, titanium dioxide, meta-silicate, calcium silicate, talc, zirconia, boron, slag, fly ash, hollow glass microspheres, solid glass, and any combination thereof. The proppant particulates may have an average particle size distribution in the range of about 5 μm to about 1700 μm. The pre-coat silane solution may comprise a silane and/or siloxane selected from the group consisting of a disilane; a trisilane; a tetrasilane; a pentasilane; a 2-silyltrisilane; a 2,2-disilytrisilane; a polysilane; a triethoxysilane; a methyldiethoxysilane; an alkoxysilane; a halosilane; an aminosilane; a chlorosilane; a N,O-bis(diethylhydrogensilyl)trifluoroacetamide; a 1,2-bis(dimethylsilyl)benzene; a tert-butyldimethylsilane; a tert-butyldiphenylsilane; a chlorodimethylsilane; a chlorodiisopropylsilane; a dichloromethylsilane; a methyldiphenylsilane; a dichloroethylsilane; a dimethoxy(methyl)silane; a dimethylphenylsilane; a diethoxymethylsilane; a diphenylsilane; a diphenylsilane; a di-tert-butylsilane; a diethylsilane; a phenylsilane; a trichlorosilane; a triphenylsilane; a triethylsilane; a 1,1,3,3-tetramethyldisilazane; a trimethoxysilane; a trihexylsilane; a 1,1,3,3-tetramethyldisiloxane; a triisopropylsilane; a tetrakis(dimethylsilyl)silane; a 1,1,2,2-tetraphenyldisilane; a tribenzylsilane; a tributylsilane; a polydimethylsiloxane; a hexamethylcyclotrisiloxane; a hexamethyldisiloxane; an octamethylcyclotetrasiloxane; an ocatmethyltrisiloxane; a decamethylcyclopentasiloxane; a decamethyltetrasiloxane; a dodecamethylcyclohexasiloxane; an allyltris(trimethylsiloxy)silane; a bis(3-trimethoxysilylpropyl)amine; a 1,3-bis(3-aminopropyl)tetramethyldisoxane; a 1,3-bis(chloromethyl)tetramethyldisiloxane; a 1,3-bis(4-hydroxybutyl)tetramethyldisiloxane); a 1,3-dichloro-1,1,3,3-tetraisopropyldisiloxane; a 1,3-dichloro-1,1,3,3-tetramethyldisiloxane; a 1,3-dimethoxy-1,1,3,3-tetraphyldisoxane; a 3-(dimethylsilyoxy)-1,1,5,5-tetramethyl-3-phenyltrisiloxane; a 1,3-divinyltetramethyldisiloxane; a 1,1,1,3,5,5,5-heptamethyl-3-(3-glycidyloxypropyl)trisiloxane; a 1,1,1,3,5,5,5-heptamethyltrisiloxane; a tetrakis(dimethylsilyoxy)silane; a 1,1,3,3-tetramethyldisiloxane; a 2,4,6,8-tetramethyl-2,4,6,8-tetravinylcyclotetrasiloxane; a 1,1,3,3,-tetraphenyl-1,3-disiloxanediol; and any combination thereof. The binding agent may be selected from the group consisting of two-component epoxy based resins, novolac resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins, polyurethane resins, acrylate resins, geopolymer resins, UV-curable resins, epoxy resins, urethane acrylate resins, epoxy methacrylate resins, epoxy-modified novolac resins, resole resins, modified resole resins, a terpolymer of phenol furfuryl alcohol and formaldehyde, melamine resins, Portland cements, pozzolanic cements, geopolymer cements, phosphate cements, gypsum cements, aluminous cements, silica cements, alkaline cements, high-content alumina cements, magnesium oxide cements, acid resistant silicate cements, oxysalt cementitious systems, silico phosphate cements, glass phosphate cements, derivatives thereof, and any combination thereof. The method may further comprise using the treatment fluid comprising the proto-aggregates in a hydraulic fracturing operation.

Provided are systems for treating a subterranean formation in accordance with the description provided herein and as illustrated by FIGS. 1-5B. An example system comprises a plurality of proto-aggregates comprising proppant particulates; a treatment fluid comprising the plurality of proto-aggregates; a pump and blender system configured to pump the treatment fluid into the fracture. The system may further comprise a fluidized bed granulator configured to prepare the proto-aggregates from the proppant particulates. The system may further comprise an auger device configured to prepare the proto-aggregates from the proppant particulates. The system may further comprise a binding agent used to prepare the proto-aggregates. The treatment fluid may further comprise a binding agent which may be that same or different from any binding agent used to prepare the proto-aggregates if a binding agent was used to prepare said proto-aggregates. The residence time of the proppant particulates in the fluidized bed granulator may be controlled such that the average particle size distribution of the proto-aggregates is less than one fifth the diameter of the opening of the fracture. The rate of addition of the proppant particulates to the auger device may be controlled such that the average particle size distribution of the proto-aggregates is less than one fifth the diameter of the opening of the fracture. The treatment fluid may be a treatment fluid selected from the group consisting of a fracturing fluid, a spacer fluid, a proppant-laden fluid, and any combination thereof. The proppant particulates may comprise a proppant particulate selected from the group consisting of sand, natural sand, quartz sand, bauxite, ceramic materials, glass materials, particulate garnet, metal particulates, nylon pellets, polymer materials, polytetrafluoroethylene materials, silica, alumina, fumed carbon, carbon black, graphite, mica, titanium dioxide, meta-silicate, calcium silicate, talc, zirconia, boron, slag, fly ash, hollow glass microspheres, solid glass, and any combination thereof. The proppant particulates may have an average particle size distribution in the range of about 5 μm to about 1700 μm. The system may further comprise a pre-coat silane solution. The pre-coat silane solution may comprise a silane and/or siloxane selected from the group consisting of a disilane; a trisilane; a tetrasilane; a pentasilane; a 2-silyltrisilane; a 2,2-disilytrisilane; a polysilane; a triethoxysilane; a methyldiethoxysilane; an alkoxysilane; a halosilane; an aminosilane; a chlorosilane; a N,O-bis(diethylhydrogensilyl)trifluoroacetamide; a 1,2-bis(dimethylsilyl)benzene; a tert-butyldimethylsilane; a tert-butyldiphenylsilane; a chlorodimethylsilane; a chlorodiisopropylsilane; a dichloromethylsilane; a methyldiphenylsilane; a dichloroethylsilane; a dimethoxy(methyl)silane; a dimethylphenylsilane; a diethoxymethylsilane; a diphenylsilane; a diphenylsilane; a di-tert-butylsilane; a diethylsilane; a phenylsilane; a trichlorosilane; a triphenylsilane; a triethylsilane; a 1,1,3,3-tetramethyldisilazane; a trimethoxysilane; a trihexylsilane; a 1,1,3,3-tetramethyldisiloxane; a triisopropylsilane; a tetrakis(dimethylsilyl)silane; a 1,1,2,2-tetraphenyldisilane; a tribenzylsilane; a tributylsilane; a polydimethylsiloxane; a hexamethylcyclotrisiloxane; a hexamethyldisiloxane; an octamethylcyclotetrasiloxane; an ocatmethyltrisiloxane; a decamethylcyclopentasiloxane; a decamethyltetrasiloxane; a dodecamethylcyclohexasiloxane; an allyltris(trimethylsiloxy)silane; a bis(3-trimethoxysilylpropyl)amine; a 1,3-bis(3-aminopropyl)tetramethyldisoxane; a 1,3-bis(chloromethyl)tetramethyldisiloxane; a 1,3-bis(4-hydroxybutyl)tetramethyldisiloxane); a 1,3-dichloro-1,1,3,3-tetraisopropyldisilazane; a 1,3-dichloro-1,1,3,3-tetramethyldisiloxane; a 1,3-dimethoxy-1,1,3,3-tetraphyldisoxane; a 3-(dimethylsilyoxy)-1,1,5,5-tetramethyl-3-phenyltrisiloxane; a 1,3-divinyltetramethyldisiloxane; a 1,1,1,3,5,5,5-heptamethyl-3-(3-glycidyloxypropyl)trisiloxane; a 1,1,1,3,5,5,5-heptamethyltrisiloxane; a tetrakis(dimethylsilyoxy)silane; a 1,1,3,3-tetramethyldisoxane; a 2,4,6,8-tetramethyl-2,4,6,8-tetravinylcyclotetrasiloxane; a 1,1,3,3,-tetraphenyl-1,3-disiloxanediol; and any combination thereof. The binding agent may be selected from the group consisting of two-component epoxy based resins, novolac resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins, polyurethane resins, acrylate resins, geopolymer resins, UV-curable resins, epoxy resins, urethane acrylate resins, epoxy methacrylate resins, epoxy-modified novolac resins, resole resins, modified resole resins, a terpolymer of phenol furfuryl alcohol and formaldehyde, melamine resins, Portland cements, pozzolanic cements, geopolymer cements, phosphate cements, gypsum cements, aluminous cements, silica cements, alkaline cements, high-content alumina cements, magnesium oxide cements, acid resistant silicate cements, oxysalt cementitious systems, silico phosphate cements, glass phosphate cements, derivatives thereof, and any combination thereof. The system may further comprise configuring the treatment fluid comprising the proto-aggregates to be used in a hydraulic fracturing operation.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method of treating a subterranean formation comprising:
    adding proppant particulates to a fluidized bed granulator for a desired residence time;
    spraying a binding agent on the proppant particulates to at least partially coat the proppant particulates with the binding agent, wherein the coated proppant particulates form proto-aggregates; wherein the residence time of the proppant particulates in the fluidized bed granulator is controlled such that the average particle size distribution of the proto-aggregates is less than one fifth the diameter of the opening of the fracture;
    activating the binding agent to cure the coated proppant particulates to bond them together to form proto-aggregates prior to introduction of the proto-aggregates in the subterranean formation;
    adding the proto-aggregates to a treatment fluid; and
    introducing the treatment fluid into a fracture within the subterranean formation.

2. The method of claim 1, wherein the binding agent is a first binding agent and wherein the method further comprises adding a second binding agent to the treatment fluid after adding the proto-aggregates to the treatment fluid, wherein the second binding agent may be the same or different from the first binding agent.

3. The method of claim 1, wherein the treatment fluid is a treatment fluid selected from the group consisting of a fracturing fluid, a spacer fluid, a proppant-laden fluid, and any combination thereof.

4. The method of claim 1, wherein the proppant particulates comprise a proppant particulate selected from the group consisting of sand, natural sand, quartz sand, bauxite, ceramic materials, glass materials, particulate garnet, metal particulates, nylon pellets, polymer materials, polytetrafluoroethylene materials, silica, alumina, fumed carbon, carbon black, graphite, mica, titanium dioxide, meta-silicate, calcium silicate, talc, zirconia, boron, slag, fly ash, hollow glass microspheres, solid glass, and any combination thereof.

5. The method of claim 1, wherein the proppant particulates have an average particle size distribution in the range of about 5 μm to about 1700 μm.

6. The method of claim 1, wherein the binding agent is selected from the group consisting of two-component epoxy based resins, novolac resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins, polyurethane resins, acrylate resins, geopolymer resins, UV-curable resins, epoxy resins, urethane acrylate resins, epoxy methacrylate resins, epoxy-modified novolac resins, resole resins, modified resole resins, a terpolymer of phenol furfuryl alcohol and formaldehyde, melamine resins, Portland cements, pozzolanic cements, geopolymer cements, phosphate cements, gypsum cements, aluminous cements, silica cements, alkaline cements, high-content alumina cements, magnesium oxide cements, acid resistant silicate cements, oxysalt cementitious systems, silico phosphate cements, glass phosphate cements, derivatives thereof, and any combination thereof.

7. The method of claim 1, further comprising using the treatment fluid comprising the proto-aggregates in a hydraulic fracturing operation.

8. A method of treating a subterranean formation comprising:
adding proppant particulates to an auger device;
adding a silane coating solution to the auger device to at least partially coat the proppant particulates; wherein the coated proppant particulates form proto-aggregates; wherein the rate of addition of the proppant particulates to the auger device is controlled such that the average particle size distribution of the proto-aggregates is less than one fifth the diameter of the opening of the fracture; wherein the proto-aggregates are formed prior to their introduction to the subterranean formation;
adding the proto-aggregates to a treatment fluid;
adding a binding agent to the treatment fluid after adding the proto-aggregates to the treatment fluid; and
introducing the treatment fluid into a fracture within the subterranean formation.

9. The method of claim 8, wherein the treatment fluid is a treatment fluid selected from the group consisting of a fracturing fluid, a spacer fluid, a proppant-laden fluid, and any combination thereof.

10. The method of claim 8, wherein the proppant particulates comprise a proppant particulate selected from the group consisting of sand, natural sand, quartz sand, bauxite, ceramic materials, glass materials, particulate garnet, metal particulates, nylon pellets, polymer materials, polytetrafluoroethylene materials, silica, alumina, fumed carbon, carbon black, graphite, mica, titanium dioxide, meta-silicate, calcium silicate, talc, zirconia, boron, slag, fly ash, hollow glass microspheres, solid glass, and any combination thereof.

11. The method of claim 8, wherein the silane coating solution comprises a silane and/or siloxane selected from the group consisting of a disilane; a trisilane; a tetrasilane; a pentasilane; a 2-silyltrisilane; a 2,2-disilytrisilane; a polysilane; a triethoxysilane; a methyldiethoxysilane; an alkoxysilane; a halosilane; an aminosilane; a chlorosilane; a N,O-bis(diethylhydrogensilyl)trifluoroacetamide; a 1,2-bis(dimethylsilyl)benzene; a tert-butyldimethylsilane; a tert-butyldiphenylsilane; a chlorodimethylsilane; a chlorodiisopropylsilane; a dichloromethylsilane; a methyldiphenylsilane; a dichloroethylsilane; a dimethoxy(methyl)silane; a dimethylphenylsilane; a diethoxymethylsilane; a diphenylsilane; a diphenylsilane; a di-tert-butylsilane; a diethylsilane; a phenylsilane; a trichlorosilane; a triphenylsilane; a triethylsilane; a 1,1,3,3-tetramethyldisilazane; a trimethoxysilane; a trihexylsilane; a 1,1,3,3-tetramethyldisiloxane; a triisopropylsilane; a tetrakis(dimethylsilyl)silane; a 1,1,2,2-tetraphenyldisilane; a tribenzylsilane; a tributyl silane; a polydimethylsiloxane; a hexamethylcyclotrisiloxane; a hexamethyldisiloxane; an octamethylcyclotetrasiloxane; an ocatmethyltrisiloxane; a decamethylcyclopentasiloxane; a decamethyltetrasiloxane; a dodecamethylcyclohexasiloxane; an allyltris(trimethylsiloxy)silane; a bis(3-trimethoxysilylpropyl)amine; a 1,3-bis(3-aminopropyl)tetramethyldisiloxane; a 1,3-bis(chloromethyl)tetramethyldisiloxane; a 1,3-bis(4-hydroxybutyl)tetramethyldisiloxane); a 1,3-dichloro-1,1,3,3-tetraisopropyldisiloxane; a 1,3-dichloro-1,1,3,3-tetramethyldisiloxane; a 1,3-dimethoxy-1,1,3,3-tetraphyldisiloxane; a 3-(dimethylsilyoxy)-1,1,5,5-tetramethyl-3-phenyltrisiloxane; a 1,3-divinyltetramethyldisiloxane; a 1,1,1,3,5,5,5-heptamethyl-3-(3-glycidyloxypropyl)trisiloxane; a 1,1,1,3,5,5,5-heptamethyltrisiloxane; a tetrakis(dimethylsilyoxy)silane; a 1,1,3,3-tetramethyldisiloxane; a 2,4,6,8-tetramethyl-2,4,6,8-tetravinylcyclotetrasiloxane; a 1,1,3,3,-tetraphenyl-1,3-disiloxanediol; and any combination thereof.

12. The method of claim 8, wherein the binding agent is selected from the group consisting of two-component epoxy based resins, novolac resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins, polyurethane resins, acrylate resins, geopolymer resins, UV-curable resins, epoxy resins, urethane acrylate resins, epoxy methacrylate resins, epoxy-modified novolac resins, resole resins, modified resole resins, a terpolymer of phenol furfuryl alcohol and formaldehyde, melamine resins, Portland cements, pozzolanic cements, geopolymer cements, phosphate cements, gypsum cements, aluminous cements, silica cements, alkaline cements, high-content alumina cements, magnesium oxide cements, acid resistant silicate cements, oxysalt cementitious systems, silico phosphate cements, glass phosphate cements, derivatives thereof, and any combination thereof.

13. The method of claim 8, further comprising using the treatment fluid comprising the proto-aggregates in a hydraulic fracturing operation.

* * * * *